April 12, 1938.    G. ORNSTEIN ET AL    2,114,234
APPARATUS FOR INDICATING OXIDIZING GASES IN AQUEOUS LIQUIDS
Filed Jan. 29, 1936
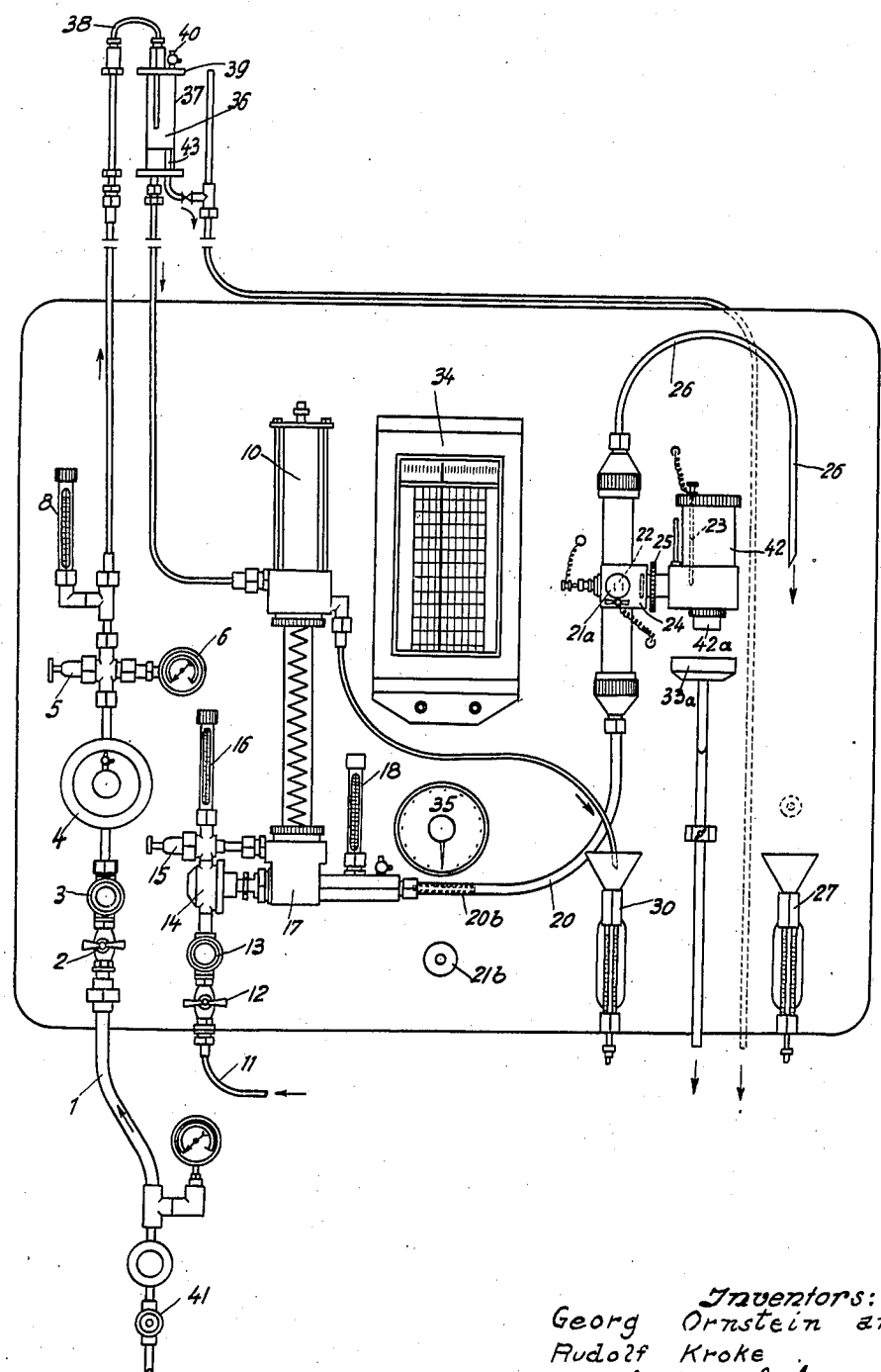
Inventors:
Georg Ornstein and
Rudolf Kroke
By Emil Bönnelycke
Attorney Patented Apr. 12, 1938

2,114,234

UNITED STATES PATENT OFFICE 2,114,234

APPARATUS FOR INDICATING OXIDIZING GASES IN AQUEOUS LIQUIDS

Georg Ornstein and Rudolf Kroke, Berlin, Germany

Application January 29, 1936, Serial No. 61,424 In Germany February 8, 1935

10 Claims.  (Cl. 204—5)

This invention relates to the testing and examination of aqueous liquids, for example boiler feed water, water for central heating installations and the like, and an object of the invention is to enable such liquids to be tested continuously for the amount of oxidizing gases, particularly oxygen, which they contain.

Owing to the fact that dissolved oxygen in warm water has a greater or less corrosive effect and attacks the walls of pipes and boilers to a greater or less extent according to the amount present in the water, it is essential for every works manager to be informed exactly as to the content of oxygen in such water. The determination of the oxygen content by chemical methods is inaccurate in practice when the content of oxygen is small and is below about 1 mg. per litre. Also if the known electrometric method be used, the accuracy of the measurement with such small content of oxygen is dependent on a number of factors all of which must certainly be kept the same in each case in order to obtain comparable results from the measurement.

One object of the invention is to provide an apparatus in which the various devices necessary for the measurement are combined to form a unit which ensures that faultless comparable results are obtained.

A further object of the invention is continuously to record the content of oxidizing gases, in particular oxygen, in the liquids examined.

Another object of the invention is to maintain constant the temperature of the liquid flowing through the measuring device by means of automatic regulating devices.

Finally, a still further object of the invention is to reduce the pressure of the liquid conducted to the measuring device and to ensure a slow and regular flow of the liquid through the measuring cell.

Further objects and advantages of the invention will appear from the following description taken in conjunction with the accompanying drawing.

The measuring apparatus in accordance with the invention is based on the following principle:

For registering the oxygen content in water, a constant quantity of the water to be examined, which is always kept at the same temperature by means of a temperature regulating device, is conducted through a cell provided with electrodes. The arrangement of the electrodes, namely positive electrode (consisting for example of platinum or copper), the water to be examined, separating wall, negative electrode (for example made of nickel or zinc), salt solution (for example nickel sulphate or zinc sulphate), effects the formation of hydrogen at the positive electrode. According to the oxygen content of the water to be examined, which flows slowly past the positive electrode, the hydrogen formed is removed and there is thereby produced a potential difference which is in direct proportion to the quantity of oxygen present in the water. This difference of potential is continuously indicated by a registering instrument and is recorded and, if the content of oxygen remains uniform, results in a straight line being produced on the recording strip.

The accompanying drawing shows a preferred form of construction of apparatus in accordance with the invention.

The important parts of this apparatus are the means for reducing the pressure and regulating the quantity, such as for example the reducing valve 4 and the regulating valves 2 and 5, the device 36 termed an aerator, the method of operation of which is hereinafter described in detail, and a temperature regulating apparatus which, in the constructional example illustrated, consists of a cooling coil provided with thermostats 17, a cooling water regulating valve 15 and thermometers 16 and 18. The other important parts are a closing device, for keeping the quantity of water to be examined exactly constant, which, in the apparatus shown in the drawing, consists of a measuring capillary 20b; and further an electric measuring cell 24 having positive and negative electrodes 22 and 23, and an indicating and recording instrument 34 and finally a regulating resistance 35.

Further additional apparatus, as for example dirt catchers or filters 3 and 13, a high pressure shut-off valve 41, a cut-off valve 12, quantity measuring apparatus 30 and 27 as well as otner parts may also be employed. Such parts, without being absolutely necessary, increase the reliability of the apparatus.

The method of operation of the complete apparatus and its individual parts is as follows:

The water to be examined enters the apparatus through the pipe 1 and the reducing valve 4 by which the pressure is reduced to the working pressure which is necessary for the operation of the apparatus and can be measured on the manometer 6. The quantity of water is regulated by means of the valve 5. The temperature of the inflowing water is indicated by the thermometer 8. The water then enters the cooling device after previously passing through the de-aerating vessel 10 in which any undissolved gases which may be present are removed in order to prevent any disturbance in the flow from being caused thereby. In the cooling apparatus by means of the thermostat 17 and the valve 14 the temperature of the water to be tested is always kept constant by automatic regulation of the cooling. The thermometer 16 is employed for checking the temperature of the cooling water which is admitted through the pipe 11. The amount of cooling water used can be checked by means of a separate quantity measuring apparatus 30 through which the used cooling water passes and in which the water rises to a certain level according to the amount flowing through. The temperature of the water to be examined is checked by the thermometer 18 which may also be provided with an indicating or signalling device in order immediately and automatically to indicate any irregularity in the temperature.

The water to be examined now passes through the measuring capillary or nozzle 20b, which is used for again exactly regulating the flow of water to be uniform, and then through the pipe 20 into the electrode cell 24. In this cell the positive electrode 22 is located in the through flow pipe and the electrode is visible through a sight hole 21a which may if desired be provided with illuminating means which can be switched on by means of the switch 21b. Opposite the cell 24 the container 42 filled with the salt solution and the negative electrode 23 are arranged. In order that this solution may always remain saturated a container 42a filled with crystals of the salt is provided below the container 42. Between the container 42 and the through flow pipe there is interposed a porous plate 25 which prevents the salt solution from flowing out, but is a conductor for the current. The water to be examined can finally be conducted through the pipe 26 to a measuring apparatus 27, which is constructed similarly to the measuring apparatus 30, for the cooling water.

The two electrodes 22 and 23 are connected through a regulating resistance 35 with the galvanometer of the recording instrument 34. According to the oxygen content of the water a deflection of the galvanometer takes place which can be continuously read off and is simultaneously recorded on a strip of paper or other material.

Since the oxygen content of boiler feed water which has been properly de-gasified is always nil, the indicating apparatus would always indicate the zero value in such cases, and one would not know whether the apparatus was functioning.

In order, therefore, to be able to check the working of the apparatus in spite of this, a definite quantity of oxygen must be introduced into the water flowing through the apparatus, so that a visible deflection of the galvanometer takes place.

For this purpose the so-called aerator 36 is employed. This consists of a container 37 having an adjustable downwardly open U-tube 38 and an air escape valve 40 fitted on the cover 39 of the container. In order to enrich the de-gasified water with oxygen, the valve 40 is opened. This causes the level of the water in the container 37 to fall to that of the overflow pipe 43, so that the water entering through the U-tube 38 passes through a layer of air containing oxygen. A constant quantity of oxygen depending on the depth of this layer is taken up by the water. This content of oxygen is indicated and recorded by the apparatus.

In order to enable a subsequent chemical control of the water to take place, there is provided a movable receiver 33a which can be disposed below the outlet pipe 26.

We claim:—

1. In an apparatus for indicating dissolved oxygen in aqueous liquids the combination with an electrical measuring cell consisting of a through-flow pipe, a positive electrode arranged in said pipe, a container for a salt solution, a negative electrode arranged in said container, a connection between the through-flow pipe and the container, and a porous plate between the through-flow pipe and the container which prevents the salt solution from flowing out of the container but conducts electric current, of means for regulating the temperature of the liquid prior to its passage to the positive electrode, and means electrically connected with said electrodes for indicating an electrical difference of potential between the electrodes.

2. In an apparatus for indicating dissolved oxygen in aqueous liquids according to claim 1 the combination with the said electrical measuring cell of means for uniformly regulating the quantity of liquid supplied to the positive electrode of the cell, and means for automatically regulating the temperature of this liquid.

3. In an apparatus for indicating dissolved oxygen in aqueous liquids according to claim 1 the combination with the said electrical measuring cell of means for regulating the pressure of the liquid supplied to the cell, a temperature regulating device, a dosing device for uniformly conducting the liquid to the positive electrode of the measuring cell, and an instrument for registering the difference of potential indicated by said indicating means.

4. Apparatus for testing the oxygen content of aqueous liquids comprising a conduit for conducting the liquid, means for reducing the pressure of the liquid in the conduit, means for regulating the temperature of the liquid, an electrical measuring cell consisting of a through-flow pipe, a positive electrode arranged in this pipe, a container for salt solution, a negative electrode arranged in said container, a connection between the through-flow pipe and the container, and a porous plate between the through-flow pipe and the container which prevents the salt solution from flowing out of the container but conducts the electric current, a dosing device for supplying a uniform flow of the liquid to the positive electrode of the measuring cell and means electrically connected with said electrodes for indicating the electrical differences of potential between the electrodes.

5. Apparatus according to claim 4 wherein the positive electrode is a platinum electrode and the negative electrode is a nickel electrode.

6. Apparatus according to claim 4 in which an aerating device is provided in the passage of the liquid before it reaches the positive electrode and which is in the form of a closable container in which an out-flow opening is provided at the lower end thereof, an air escape valve provided at the upper end thereof, an over-flow pipe in the lower part of the container and an inverted U-shaped tube which has one end connected with the supply conduit for the aqueous liquid and the other end thereof leads into the container having its outlet at a point higher than the inlet opening of the over-flow pipe.

7. Apparatus as in claim 4, and means for supplying oxygen to said liquid before said liquid enters said measuring cell.

8. Apparatus as in claim 4, and means for measuring the quantity of liquid flowing away from said cell.

9. Apparatus as in claim 4, said dosing device comprising a measuring capillary positioned between said temperature regulating device and said measuring cell.

10. Apparatus as in claim 4, an aerating device comprising a closed container having an out-flow opening in the lower end thereof, an overflow pipe connected to said container at said out-flow opening, an inverted U-shaped tube having one end connected with said conduit and the other end leading into said container and terminating at a point higher than said out-flow opening, and means for regulating the distance said liquid can pass through air contained in the space between said other end of said tube and said out-flow opening.

GEORG ORNSTEIN.
RUDOLF KROKE.